United States Patent Office 2,964,546
Patented Dec. 13, 1960

---

2,964,546
PREPARATION OF DECANOIC ACID FROM CUPHEA LLAVEA SEED

Thomas K. Miwa, Cecil R. Smith, Jr., and Timothy L. Wilson, Peoria, Ill., assignors to the United States of America as represented by the Secretary of Agriculture No Drawing. Filed May 11, 1960, Ser. No. 28,501

1 Claim. (Cl. 260—415)

(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to the discovery of a novel means of preparing decanoic (capric) acid.

Decanoic acid has known utility as a starting material in the preparation of esters for perfumes and fruit flavors. It is also used as a base for wetting agents and as a plasticizer.

Decanoic acid is prepared commercially by fractional distillation of coconut oil fatty acids, but this necessitates the importation of a costly raw material containing only a small proportion of decanoic acid.

A principal object of our invention is the preparation of decanoic acid employing as starting material the seed oil of a readily cultivatable domestic plant rather than imported coconut oil. Another object is the preparation of decanoic acid in high yields through the treatment of source material rich in constituent decanoic acid.

We have now discovered that the principal constituent fatty acid (83 percent) comprising the seed oil glycerides of *Cuphea llavea* var. *miniata* (cinnabar *cuphea*) is decanoic acid and that this acid comprises about 16 percent by weight of the dry seed. At least about 72 percent weight recovery (87 percent of the amount shown by analysis to be present) of the constituent decanoic acid of the *Cuphea llavea* seed oil can be isolated in a purity of 97 percent by simply steam distilling the mixed fatty acids recovered from saponified and neutralized *Cuphea llavea* oil obtained by Soxhlet extraction of coarsely crushed Cuphea seeds with petroleum ether.

The following specific example illustrates the practice of our invention:

Example

Eight and seventy-nine hundredths grams of glyceride oil obtained by petroleum ether extraction of coarsely crushed seeds of *Cuphea llavea* was saponified by refluxing under nitrogen for 3 hours at room temperature with 90 ml. 0.8 N ethanolic potassium hydroxide. Water was then added and the unsaponifiables (0.34 g. or 3.9 percent) were removed by extracting with diethyl ether. The aqueous ethanolic mixture remaining was acidified with sulfuric acid, thus freeing the fatty acids from the soaps. The free fatty acids were then extracted with successive portions of diethyl ether which were then pooled, dried over sodium sulfate, and freed of solvent by evaporation to provide 7.43 g. (84 percent) of the mixed fatty acids present in the seed. The mixed fatty acids were then steam distilled and collected as fractions I (1.03 g.), II (3.26 g.), and III (1.21 g.) during respectively 0–1 hr., 1–5 hrs., and 5–9 hrs., leaving a residue of 0.75 g. Mixed methyl esters of each fraction were prepared for gas chromatographic analysis by reacting with diazomethane, and it was found that 96.8 percent of the fatty acid constituents of fraction I was decanoic acid, likewise 98.3 percent of the fatty acids comprising fraction II, and 93.5 percent of the fatty acids present as fraction III.

We further identified the decanoic acid by preparing its amide (using 0.331 g. of mixed free acids comprising fraction II) by the method of Shriner, et al., "The Systematic Identification of Organic Compounds," 4th ed. (1957), pp. 200–277, John Wiley and Sons, New York. After 3 recrystallizations from aqueous ethanol 0.110 g. of white crystals having a M.P. of 96–97° C. were obtained and gave no depression of melting point on admixture with authentic decanoic acid amide.

Having fully disclosed our invention we claim:

The method of obtaining high yields of substantially pure decanoic acid comprising the steps of solvent extracting the coarsely crushed seeds of *Cuphea llavea*, saponifying and neutralizing the obtained mixed glyceride oil, solvent extracting the mixed fatty acids, and steam distilling to obtain substantially pure decanoic acid therefrom.

No references cited.